United States Patent [19]

Dragsund et al.

[11] Patent Number: 4,716,553
[45] Date of Patent: Dec. 29, 1987

[54] FLOAT FOR USE IN SEISMIC SURVEYS OF THE SEA BED

[75] Inventors: Inge Dragsund, Ulsteinvik; Einar Gjestrum, Oslo, both of Norway

[73] Assignee: Geophysical Company of Norway A.S., Horvik, Norway

[21] Appl. No.: 685,449

[22] Filed: Dec. 24, 1984

[30] Foreign Application Priority Data

Dec. 23, 1983 [NO] Norway .................................. 834803

[51] Int. Cl.⁴ .......................... G01V 1/38; B63B 21/16
[52] U.S. Cl. ...................................... 367/15; 114/242;
114/245; 114/246; 114/254; 181/110; 181/118;
181/140; 367/18; 367/106; 367/144; 367/20;
254/266
[58] Field of Search .................. 114/51, 242, 334, 244,
114/245, 246, 249, 251, 253, 254, 267, 268, 330,
331; 181/110, 111, 112, 118, 120, 140, 141;
367/13, 14, 15, 16, 17, 18, 19, 20, 106, 130, 141,
142, 143, 144, 145, 146, 147, 148, 153, 154, 169;
254/265, 266, 267, 278, 279, 283, 290

[56] References Cited

U.S. PATENT DOCUMENTS

| | | | |
|---|---|---|---|
| 3,309,652 | 3/1967 | Trent et al. | 114/244 X |
| 3,611,977 | 10/1971 | Mosvold | 114/253 X |
| 3,718,207 | 2/1973 | Babb | 181/0.5 |
| 3,805,730 | 4/1974 | Henderson et al. | 114/244 |
| 4,080,921 | 3/1978 | Freitag | 114/249 |
| 4,200,052 | 4/1980 | Cunningham et al. | 114/247 X |
| 4,436,049 | 3/1984 | Ante et al. | 114/254 |
| 4,455,961 | 6/1984 | Hansen et al. | 114/253 X |
| 4,480,574 | 11/1984 | Bertrams | 114/242 X |
| 4,506,352 | 3/1985 | Brandsaeter et al. | 367/16 |
| 4,516,517 | 5/1985 | Ayers | 114/246 X |
| 4,552,086 | 11/1985 | Boe et al. | 114/242 |
| 4,570,245 | 2/1986 | Thigpen | 367/15 |
| 4,581,723 | 4/1986 | Savit | 367/15 |

FOREIGN PATENT DOCUMENTS

| | | | |
|---|---|---|---|
| 148762 | 8/1983 | Norway . | |
| 150751 | 12/1984 | Norway . | |
| 1087413 | 4/1984 | U.S.S.R. | 114/242 |

Primary Examiner—Donald P. Walsh
Assistant Examiner—Brian S. Steinberger
Attorney, Agent, or Firm—Holman & Stern

[57] ABSTRACT

A float for use in seismic surveys of the sea bed supports a plurality of seismic pulse transmitters (6) which are suspended on lines (7) beneath the float (1). At a distance from the front end of the float (1), on one sidewall thereof, a fastening device for a towing cable and a lead-in for control lines and lines for supplying operating medium to the pulse transmitters are provided. These lines and cables are gathered in a common line (3) which extends behind the tow ship. The line (3), at a distance away from the float (1), is connected to a line (4) which leads to a length-regulating device (12) inside the front section of the float. The float is also provided with at least one motor (10) with a drive shaft (9) leading to hoisting drums (8) for the lines (7) to the respective seismic pulse transmitters (6). Both the motors (10, 12) and the seismic pulse transmitters (6) are connected to the pneumatic supply line. The control lines lead to control devices at the separate components, permitting active steering of the system from on board the ship.

13 Claims, 6 Drawing Figures

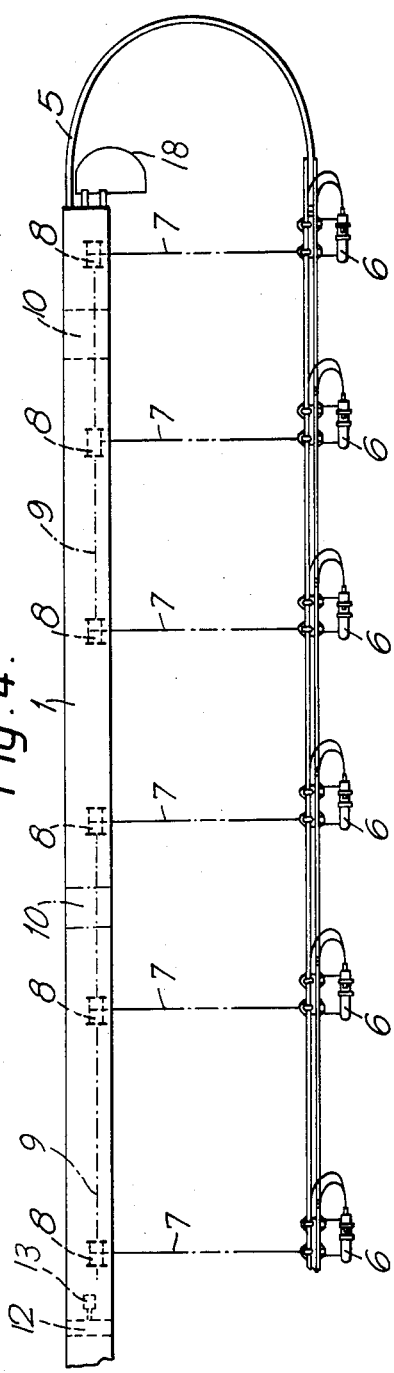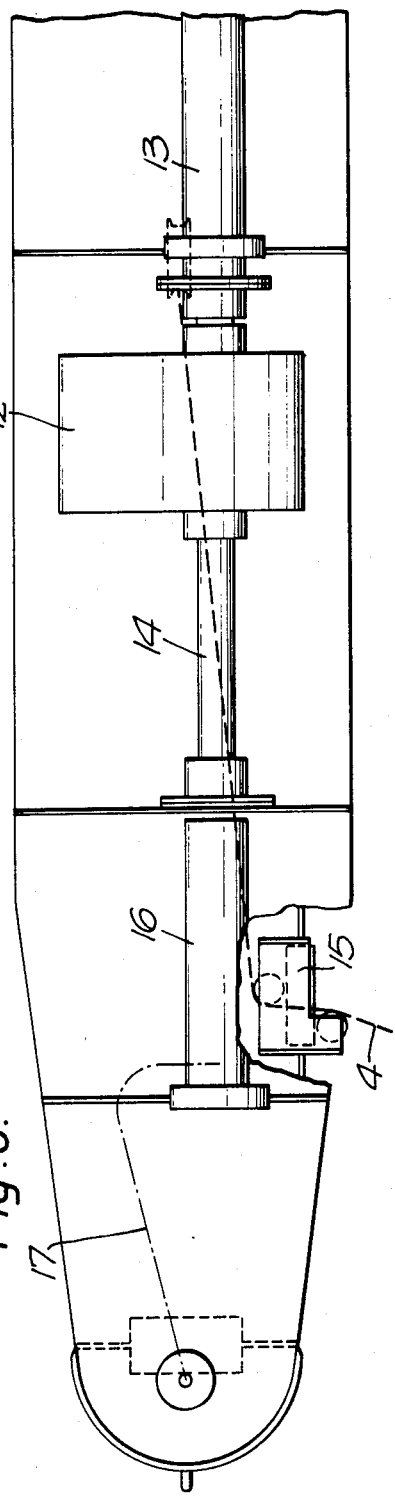

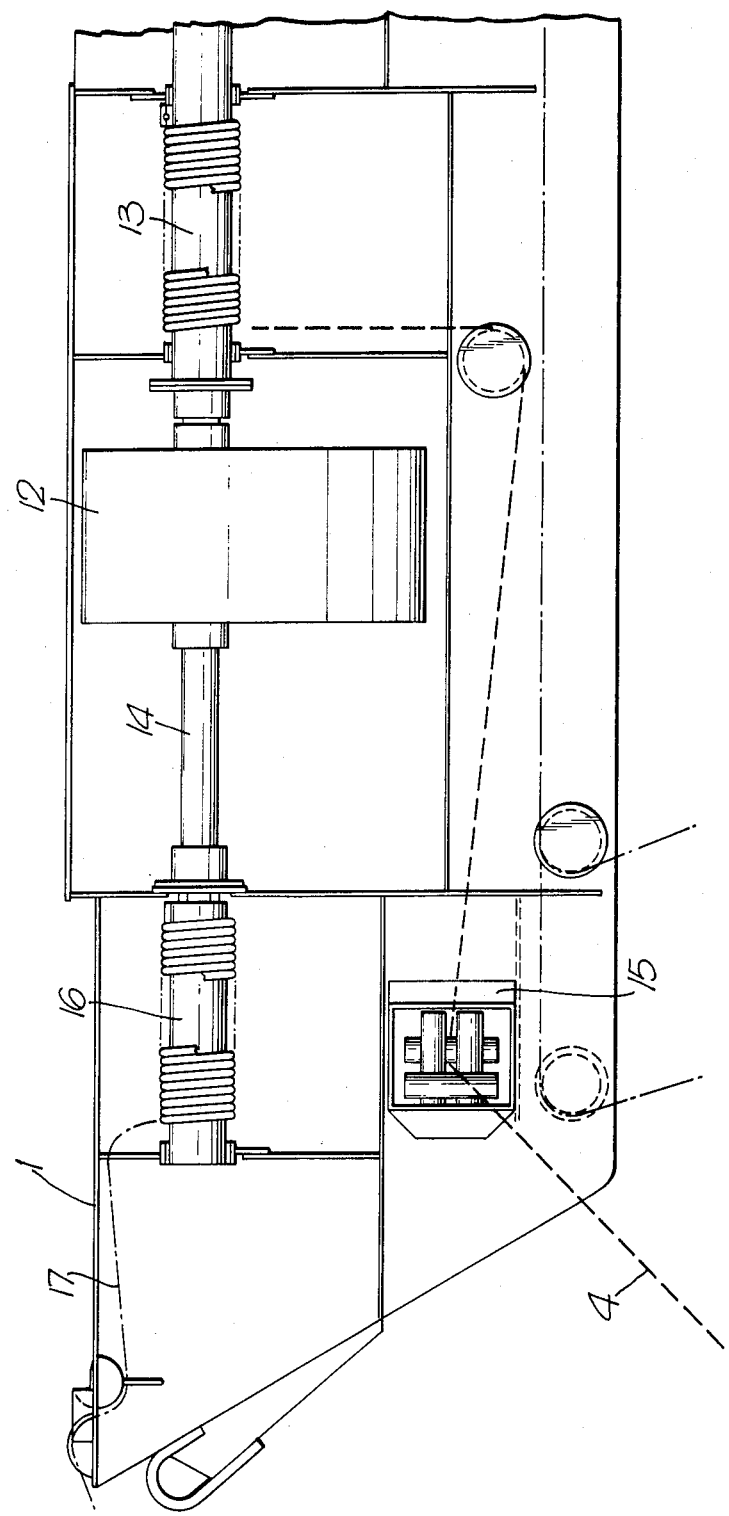

FLOAT FOR USE IN SEISMIC SURVEYS OF THE SEA BED

BACKGROUND OF THE INVENTION

1. Field of the Invention

The invention relates to a float for use in seismic surveys of the sea bed, wherein the float is intended to support a plurality of seismic pulse transmitters suspended on lines from the float, and the float is formed as an elongated body made of a rigid material.

2. Description of the Prior Art

In seismic surveying, rows of seismic pulse transmitters are towed behind a ship, and the pulse transmitters are suspended from float bodies or floats. Various embodiments of such floats have been employed. One arrangement is to suspend each transmitter from a separate float buoy. Another arrangement that has been utilized involves the use of elongated float bodies which preferably are flexible and hose-shaped, permitting the float to glide easily through the water. The suspension of the pulse transmitters by lines from the floats has been a source of problems with all of the prior art floats, however, because the numerous lines can easily become entangled, especially when the floats are being deployed or retrieved. Problems have also been experienced in steering the floats so that they follow the desired and preferred course, particularly in the case of surveys in which the transmitters are to be dispersed to cover a broad expanse or area. Further, problems have arisen in connection with replacing a float, or a transmitter or array of transmitters in the system.

BRIEF SUMMARY OF THE INVENTION

The object of the present invention is to provide a float which does not have the drawbacks of the prior art systems. A further object of the invention is to provide a float for supporting the seismic pulse transmitters which permits optimum, accurate positioning of the float or the seismic pulse transmitters, which enables the depth of the transmitters to be adjusted in a simple manner, and which also exhibits minimum resistance as it is being towed through the water. Another object of the invention is to simplify replacement of the transmitter, as well as deployment and retrieval of the float with the seismic pulse transmitters from the ship.

The above objects are obtained with a float in accordance with the invention whose characteristic features are described hereinafter.

In seismic surveying, the transmitters are normally arranged in arrays of subarrays which operate synchronously or according to a specified pattern during transmission of the pulses.

With the float of the invention, each individual subarray can be individually steered into any position within a rather extensive area behind the tow vessel, and held in this position within a certain or predetermined limit of tolerance. Position control is obtained through the use of steering means, preferably pneumatically driven, which obtain the air they need to operate from the already existing high pressure air hoses leading to the subarray. Positioning of the subarray can be contionously controlled from the ship. Such individual positioning of each separate subarray means that all desired array configurations can easily be obtained. It is also quite simple to alter the configuration. Furthermore, such individual, independent position control means of each individual subarray can be taken on board the vessel for repair or maintenance without affecting the other subarrays in the configuration.

It is also possible to control the depth placement of the pulse transmitter in the water with great accuracy. Adjustments can be made while the transmitters are in the sea by means of drive winches, preferably pneumatically driven. Adjustment and control are again regulated from the ship. During deployment or retrieval of the floats, the transmitters are drawn up underneath the float. The equipment is then winched on board without parts of the subarray touching the deck. This will reduce wear of and damage to the array.

The float of the invention also provides a further reduction of the total tow resistance compared with existing equipment. In addition to the fact that the tow resistance of each subarray is reduced, the arrays extending in the lateral direction relative to the direction of ship propulsion may be towed without the aid of extra rudder equipment. This alone provides greatly reduced tow resistance.

BRIEF DESCRIPTION OF THE DRAWINGS

The invention will now be explained in greater detail with reference to an exemplary embodiment illustrated in the accompanying drawings, wherein:

FIG. 4 is a schematic partial side elevational view (without the towing cable) showing the placement of the hoisting means for the pulse transmitters;

FIG. 5 is a partially schematic vertical cross-sectional view through the front section of a float according to the invention, showing the position control means; and FIG. 6 is a to plan view of FIG. 5 partially cut/away to show hidden parts; and

DETAILED DESCRIPTION OF THE PREFERRED EMBODIMENT

According to the invention, a ship S tows a plurality of seismic energy sources of pulse transmitters through the water. The transmitters are arranged in arrays or subarrays, which are held floating in the water by means of floats 1, 1', 1" and 1'". Downstream of the illustrated floats are additional floats with further subarrays of transmitters. Between the seismic pulse transmitters, a receiver cable or streamer 2 is towed behind the ship.

Figure 1:
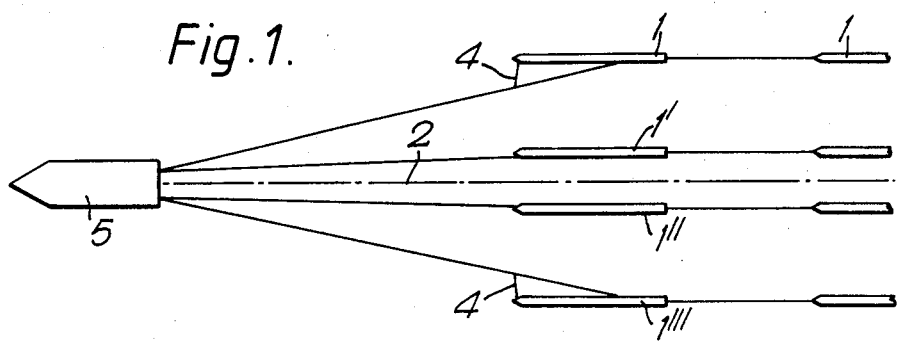
FIG. 1 is a schematic drawing showing the floats of the invention under tow.
Figure 2:
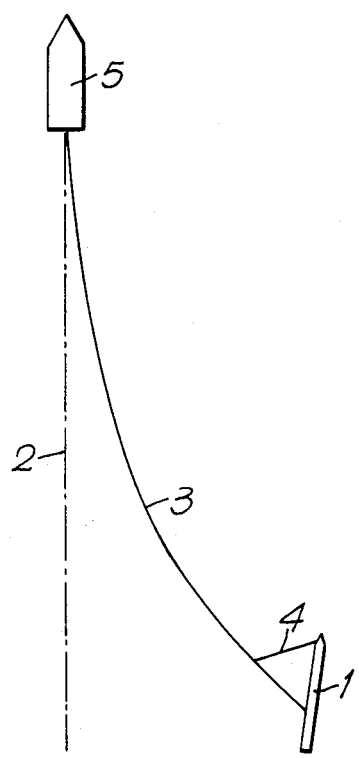
FIG. 2 is a plan view which schematically illustrates the lateral course deviation and extension of the floats relative to the ship.

FIG. 2 illustrates in plan view and in strictly schematic fashion how a float with its array of pulse transmitters is caused to deviate laterally relative to the ship S. A utility line 3 leads to the float 1 and comprises a towing cable and additional lines for position control of the floats and for supplying the operating medium (e.g., compressed air) to the pulse transmitters at the float body. The line is attached to the side of the float 1 preferably at its middle section. A regulation line 4 extends from the front section of the float 1 to the line 3, and the length of the line 4 is adjustable. By adjusting the length of the line 4, the float can be guided into a position of greater or lesser lateral deviation relative to the direction of ship propulsion, in the same manner as when steering an otterboard.

Figure 3:
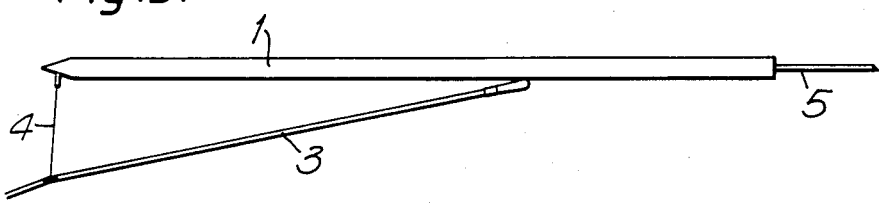
FIG. 3 is a view similar to FIG. 2 showing an enlarged schematic drawing of a float according to the invention and its connection to the towing cable that extends from the ship.

The connection of the float to the line 3 and line 4 is shown in greater detail in FIG. 3. The line 3 comprises a towing cable which is fastened to the side of the float in a suitable manner. Inside the line 3 are also control lines for transmitting control pulses and for transferring signals between the individual actuable elements in the float, and for tripping or actuating the seismic pulse transmitters. The preferred working substance or operating medium at the present time is compressed air, i.e. pneumatic equipment. These lines are guided into the interior of the float 1. In the illustrated embodiment, the pneumatic line which leads to the seismic pulse transmitters, which in this case are air guns, exits at the stern end of the float, and is designated by numeral 5.

FIG. 4 shows part of the float in side elevation. The pneumatic line 5 is guided down to the seismic pulse transmitters or air guns 6, which are suspended on lines 7 from the float. The special feature of these lines according to the invention is that they can be raised and lowered by being wound around hoisting drums 8, which are disposed on a common shaft 9 driven by a motor 10. The drums, shaft and motor are arranged within the float. The motor 10 is pneumatically driven by the compressed air supplied through the line 3. The assembly is provided with control means and valves of conventional design which permit it to perform dual functions. From the ship, one can switch the supply of compressed air between the air guns 6 and the motor 10. When the air is not needed for actuating the guns, it can be supplied to the motor for raising or lowering the air guns.

Provided at the front section of the float is another pneumatic motor 12 that drives a drum 13 for adjusting the length of the regulation line 4.

The various components are only schematically illustrated in FIG. 4, as these are composed of known elements and one skilled in the art may easily construct the assembly on this basis. It should be noted, however, that it is possible to divide the shaft 9 to permit a partial group of air guns to be lowered independently of the others. In that case, a corresponding number of drive motors must also be provided. Many such possibilities exist within the scope of the invention.

FIGS. 5 and 6 show the front section of the float of the invention, with a pneumatically driven motor 12 for regulating the length of the line 4. The line 4 enters the front section of the float 1 through a separate roller assembly 15 and is guided around a bending idler roller up to a drum 13, which is arranged on the shaft 14 of the pneumatically driven motor 12. A control signal transmitted from the ship actuates the motor 12, which rotates the drum 13, and at the same time the motor is moved along the shaft 14 so that the line is wound up one coil at a time, which permits accurate measurement of the wound-up length by recording the revolutions per minute of the motor. In this manner, the length of the line 4 can be regulated with precise accuracy. The length of the lines connecting the air guns 6 to the hoisting means is measured in a similar manner.

Another drum 16 is also arranged on the shaft 14, intended for coiling up an extra line 17 which is guided forward to exit at the front section of the float 1. This line hangs free in the sea and is detachably fastened to the line 3; it is an auxiliary line which is used when the floats are being deployed or taken back on board the ship. To prevent it from becoming entangled with other equipment and other lines, the auxiliary line is wound around the drum 16 as shown.

It should also be noted that it may be practical to arrange an auxiliary rudder 18 at the stern of the float. This is used for initial guidance of the float away from its zero-angle position relative to the longitudinal direction of the ship, prior to final positioning of the float by means of the regulation line 4.

Each float will preferably carry an array of seismic pulse transmitters, and the float may be, say, 22 meters long. By means of the hoisting means, the air guns can be raised and lowered within a range of 2–15 meters. The hoisting and control means are pneumatically driven. The control of the various functions is preferably electronically/pneumatically powered. The float and equipment which comes in contact with seawater are preferably made of stainless steel, plastic or salt-water-resistant materials. The equipment that is located within closed compartments, which is not made of stainless steel, is protected by overpressure and leakage air. Some of these compartments may be self-draining. The float is constructed in such manner that it can be adapted to various types and length of transmitter subarrays. The float is constructed in sections and is simple to maintain. When the float has been winched on board the towing vessel, it is preferably suspended from a traveling crab or winch and stored on a rail system on board the ship.

The specification shows only one exemplary embodiment of the invention, and many modifications of this embodiment are possible within the scope of protection defined in the patent claims.

We claim:

1. In a float for use in seismic surveys of the sea bed wherein an elongated float connected to a towing cable from a vessel for towing the float has at least one shaft rotatably mounted thereon, at least one seismic pulse transmitter suspension and hoisting drum on said shaft, a suspension line member on said at least one suspension and hoisting drum, a seismic pulse transmitter suspended on said suspension line, and drive means for rotating said at least one shaft and suspension and hoisting drum for raising and lowering said at least one seismic pulse transmitter with respect to said float, the improvement comprising:

an attachment means for the towing cable on said float;

at least one utility line extending from the vessel to the float for conducting power means for controlling operation of said at least one seismic pulse transmitter and drive means, the power means being operatively connected to said at least one seismic pulse transmitter and drive means;

said at least one seismic pulse transmitter being pneumatically driven;

said drive means being at least one pneumatically driven motor;

a steering control line engaging near one end thereof with the float at a position spaced from said towing cable attachment means and having the other end connected to said towing cable at a position spaced from said towing cable attachment means; and pneumatically driven motor means mounted on said float and connected to said one end of said steering control line for adjusting the length of said steering control line to guide and control the position of the float so that varying the length of said steering control line varies the lateral deviation of the course of the float as it is towed from the longitudinal course of the vessel;

said power means of said at least one utility line being operatively connected to said length adjustment means for operating said length adjustment means.

2. A float as claimed in claim 1 wherein:

said length adjustment means comprises a control line drum rotatably mounted on said float and engaging with said steering control line so that said steering control line is wound on or unwound from said control line drum by rotation of said control line drum; and said pneumatically driven motor means for adjusting the length of said steering control line is operatively connected to said control line drum for rotating said control line drum.

3. A float as claimed in claim 1 wherein:

said at least one shaft comprises a plurality of separate shafts;

said at least one seismic pulse transmitter suspension and hoisting drum comprises at least one separate drum on each separate shaft within the float, a suspension line being provided on each separate drum and a seismic pulse transmitter being provided on each suspension line; and said at least one pneumatically driven motor comprises a separate pneumatically driven motor for each separate shaft.

4. A float as claimed in claim 1 wherein:

said at least one utility line extends outwardly from the stern of the float for connection to said at least one seismic pulse transmitter.

5. A float as claimed in claim 1 and further comprising:

watertight compartments in said float, said at least one pneumatically driven motor and said pneumatically driven motor means for adjusting the length of said steering control line being disposed in said watertight compartments.

6. A float as claimed in claim 1 and further comprising:

an auxiliary line having one end detachably connected to said utility line externally of the float; and a regulating means operatively connected to said pneumatically driven motor means for adjusting the length of said steering control line and to the other end of said auxiliary line so that said pneumatically driven motor means regulates the length of said auxiliary line.

7. A float as claimed in claim 1 and further comprising:

an auxiliary rudder operatively mounted on the stern of said float; and means for operating said auxiliary rudder.

8. A float as claimed in claim 1 wherein:

steering guide means is mounted on said float; and said steering control line passes through said steering guide means so that said steering guide means comprises the position on the float at which the force of said steering control line is exerted for steering the float.

9. A float as claimed in claim 8 wherein:

said towing cable attachment means is mounted approximately at the middle of the float; and said steering guide means is mounted near the front of said float.

10. A float as claimed in claim 9 wherein:

said steering guide means comprises a roller assembly.

11. A float as claimed in claim 10 wherein:

said length adjustment means comprises a control line drum rotatably mounted on said float and engaging with said steering control line so that said steering control line is wound on or unwound from said control line drum by rotation of said control line drum; and said pneumatically driven motor means for adjusting the length of said steering control line is operatively connected to said control line drum for rotating said control line drum.

12. A float as claimed in claim 11 and further comprising:

first measuring means for measuring the length of the suspension line wound on said suspension and hoisting drum; and 13. A float as claimed in claim 12 and further comprising:

an auxiliary rudder operatively mounted on the stern of said float; and means for operating said auxiliary rudder.

* * * * *